US012688224B2

(12) United States Patent (10) Patent No.: US 12,688,224 B2

Corrado et al. (45) Date of Patent: **\*Jul. 21, 2026**

(54) CLASSIFYING DATA OBJECTS

(71) Applicant: Google LLC, Mountain View, CA (US)

(72) Inventors: Gregory Sean Corrado, San Francisco, CA (US); Tomas Mikolov, Jersey City, NJ (US); Samuel Bengio, Los Altos, CA (US); Yoram Singer, Palo Alto, CA (US); Jonathon Shlens, San Francisco, CA (US); Andrea L. Frome, Oakland, CA (US); Jeffrey Adgate Dean, Palo Alto, CA (US); Mohammad Norouzi, Richmond Hill (CA)

(73) Assignee: Google LLC, Mountain View, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/606,458

(22) Filed: Mar. 15, 2024

(65) Prior Publication Data

US 2024/0220527 A1 Jul. 4, 2024

Related U.S. Application Data

(63) Continuation of application No. 16/998,891, filed on Aug. 20, 2020, now Pat. No. 11,960,519, which is a (Continued)

(51) Int. Cl.
| | |
|---|---|
| G06F 16/35 | (2025.01) |
| G06F 16/50 | (2019.01) |
| G06F 16/55 | (2019.01) |

(52) U.S. Cl.
CPC .............. G06F 16/35 (2019.01); G06F 16/50 (2019.01); G06F 16/55 (2019.01)

(58) Field of Classification Search
None
See application file for complete search history.

(56) References Cited

U.S. PATENT DOCUMENTS

| | | | |
|---|---|---|---|
| 9,037,464 | B1 | 5/2015 | Mikolov |
| 2004/0172393 | A1 | 9/2004 | Kazi |

(Continued)

FOREIGN PATENT DOCUMENTS

| | | | | | |
|---|---|---|---|---|---|
| EP | 1079314 | A2 | * | 2/2001 | ........... G06F 16/355 |

OTHER PUBLICATIONS

Socher, R. et al., "Zero-shot learning through cross-modal transfer," . Dec. 2013, Proceedings of Neural Information Processing Systems Conference, 10 pages. (Year: 2013).*

Frome, A. et al. Devise: A deep visual-semantic embedding model. Proceedings of Neural Information Processing Systems Conference. Dec. 2013, 11 pages.

(Continued)

*Primary Examiner* — Kannan Shanmugasundaram

(74) *Attorney, Agent, or Firm* — Fish & Richardson P.C.

(57) ABSTRACT

Methods, systems, and apparatus, including computer programs encoded on computer storage media, for classifying data objects. One of the methods includes obtaining data that associates each term in a vocabulary of terms with a respective high-dimensional representation of the term; obtaining classification data for a data object, wherein the classification data includes a respective score for each of a plurality of categories, and wherein each of the categories is associated with a respective category label; computing an aggregate high-dimensional representation for the data object from high-dimensional representations for the category labels associated with the categories and the respective scores; identifying a first term in the vocabulary of terms having a high-dimensional representation that is closest to the aggregate high-dimensional representation; and selecting the first term as a category label for the data object.

20 Claims, 3 Drawing Sheets

Related U.S. Application Data continuation of application No. 14/576,907, filed on Dec. 19, 2014, now Pat. No. 10,769,191.

(60) Provisional application No. 61/919,607, filed on Dec. 20, 2013.

(56) References Cited

U.S. PATENT DOCUMENTS

| | | |
|---|---|---|
| 2005/0143971 A1 | 6/2005 | Burstein |
| 2007/0112792 A1* | 5/2007 | Majumder .......... G06F 16/9535 |
| 2008/0144943 A1 | 6/2008 | Gokturk |
| 2009/0290800 A1 | 11/2009 | Lo |
| 2011/0119467 A1 | 5/2011 | Cadambi |
| 2013/0304469 A1 | 11/2013 | Kamada |
| 2014/0279774 A1 | 9/2014 | Wang |

OTHER PUBLICATIONS

Krizhevsky, Alex et al. Imagenet Classification with Deep Convolutional Neural Networks. Proceedings of Neural Information Processing Systems Conference 25. Dec. 2012, 1106-1114.

Lampert, C. et al. Learning to detect unseen object classes by between-class attribute transfer. IEEE Computer Vision and Pattern Recognition (CVPR) 2009. Jun. 2009, 8 pages.

Mikolov, Tomas et al. Efficient Estimation of Word Representations in Vector Space. International Conference on Learning Representations (ICLR), Scottsdale, Arizona, USA. May 2013, 12 pages.

Palatucci, M. et al. Zero-shot learning with semantic output codes. Proceedings of Neural Information Processing Systems Conference. Dec. 2009, 9 pages.

Rohrbach, M. et al. Evaluating knowledge transfer and zero-shot learning in a largescale setting. IEEE Computer Vision and Pattern Recognition (CVPR) 2011. Jun. 2011, 1641-1648.

* cited by examiner

CLASSIFYING DATA OBJECTS

CROSS REFERENCE TO RELATED APPLICATIONS

This is a continuation of U.S. application Ser. No. 16/998,891, filed on Aug. 20, 2020, which is a continuation of U.S. application Ser. No. 14/576,907, filed on Dec. 19, 2014, now issued as U.S. Pat. No. 10,769,191, which claims priority to U.S. Provisional Application No. 61/919,607, filed on Dec. 20, 2013. The disclosures of the prior applications are considered part of and are incorporated by reference in the disclosure of this application.

BACKGROUND

This specification relates to classifying data objects using data processing systems.

Data object classification systems can classify data objects into one or more pre-determined categories. For example, visual recognition systems can identify objects in images, i.e., classify input images as including objects from one or more object categories. Some data object classification systems use one or more neural networks to classify an input data object.

Neural networks are machine learning models that employ one or more layers of models to generate an output, e.g., a classification, for a received input. Some neural networks include one or more hidden layers in addition to an output layer. The output of each hidden layer is used as input to the next layer in the network, i.e., the next hidden layer or the output layer of the network. Each layer of the network generates an output from a received input in accordance with current values of a respective set of parameters.

SUMMARY

In general, one innovative aspect of the subject matter described in this specification can be embodied in methods that include the actions of obtaining data that associates each term in a vocabulary of terms with a respective high-dimensional representation of the term, wherein the high-dimensional representation of the term is a numeric representation of the term in a high-dimensional space; obtaining classification data for a data object, wherein the classification data includes a respective score for each of a plurality of categories, wherein the respective score for each of the plurality of categories represents a likelihood that the data object belongs to the category, and wherein each of the categories is associated with a respective category label; computing an aggregate high-dimensional representation for the data object from high-dimensional representations for the category labels associated with the categories and the respective scores; identifying a first term in the vocabulary of terms having a high-dimensional representation that is closest to the aggregate high-dimensional representation; and selecting the first term as a category label for the data object. Other embodiments of this aspect include corresponding computer systems, apparatus, and computer programs recorded on one or more computer storage devices, each configured to perform the actions of the methods.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Particular embodiments of the subject matter described in this specification can be implemented so as to realize one or more of the following advantages. By configuring a data object classification system to predict representations of labels in a high-dimensional space, category labels for data objects can be accurately predicted. Additionally, the accuracy of zero-shot predictions, i.e., predictions of labels that were not observed during training, can be improved. Further, labels that are inaccurately predicted by the data object classification system may be semantically or syntactically related to the correct label for the input data object. Additionally, the visual recognition system may be able to easily predict labels that are specific, generic, or both for a given data object. The accuracy of an initial data object classification system can be improved without training the initial data object classification system further and without any significant increase in computing resources used by the initial classification system.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

This specification generally describes a data object classification system that receives an input data object and generates a classification for the input data object.

Figure 1:
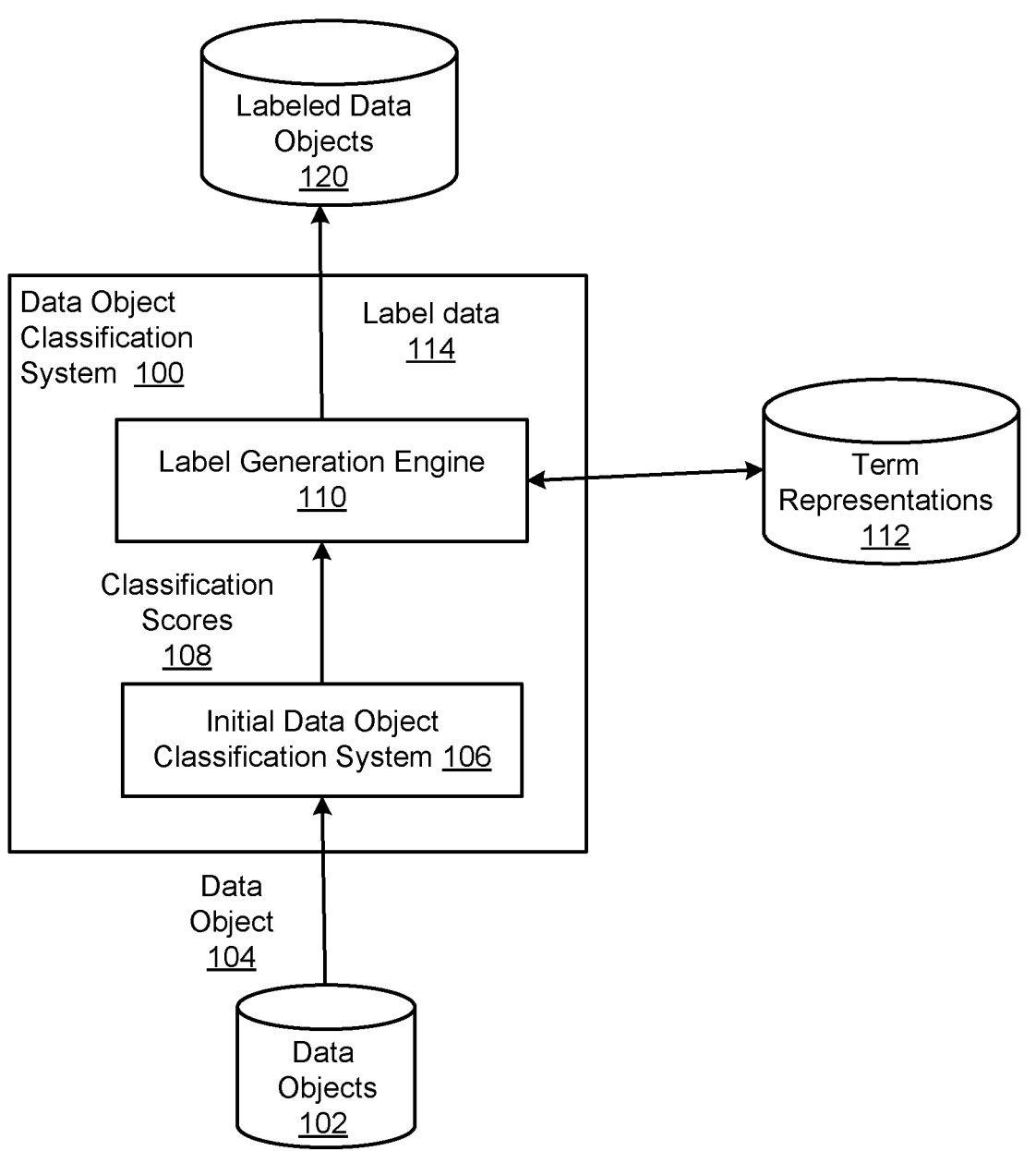
FIG. 1 shows an example data object classification system.

FIG. 1 shows an example data object classification system 100. The data object classification system 100 is an example of a system implemented as computer programs on one or more computers in one or more locations, in which the systems, components, and techniques described below can be implemented.

The data object classification system 100 generates label data for input data objects, e.g., label data 114 for a data object 104 from an input data object database 102. The label data for a given data object identifies one or more category labels for the data object. Each of the category labels is a label for a category to which the data object classification system 100 has determined that the data object belongs. Generally, a category label for a given category is a term that identifies or otherwise describes the category.

The data object classification system 100 may be configured to generate label data for any of a variety of data objects, i.e., any kind of data object that can be classified as belonging to one or more categories, each of which is associated with a respective label.

For example, if the input data objects are images, the data object classification system 100 may be a visual recognition system that determines whether an input image includes images of objects that belong to object categories from a predetermined set of object categories. In this example, the label data for a given input image identifies one or more labels for the input image, with each label labeling a respective object category to which an object pictured in the image belongs.

As another example, if the input data objects are videos or portions of videos, the data object classification system 100 may be a video classification system that determines what topic or topics an input video or video portion relates to. In this example, the label data for a given video or video portion identifies one or more labels for the video or video portion, with each label identifying a respective topic to which the video or video portion relates.

As another example, if the input data objects are audio data, the data object classification system 100 may be a speech recognition system that determines, for a given spoken utterance, the term or terms that the utterance represents. In this example, the label data for a given utterance identifies one or more labels, with each label being a term represented by the given utterance.

As another example, if the input data objects are text data, the data object classification system 100 may be a text classification system that determines what topic or topics an input text segment relates to. In this example, the label data for a given text segment identifies one or more labels for the text segment, with each label identifying a respective topic to which the video or video portion relates.

Once the label data for a given input data object is generated, the data object classification system 100 may store the data object in a labeled data object database 120. For example, the system may store the data object in association with the label data for the data object, i.e., in association with data identifying the labels that have been generated for the data object. In some implementations, instead of or in addition to storing the input data object in the labeled data object database 120, the data object classification system 100 may associate the label or labels with the input data object and provide the labeled data object for use for some immediate purpose.

The data object classification system 100 includes an initial data object classification system 106 and a label generation engine 110.

The initial data object classification system 106 receives input data objects, e.g., the data object 104 from the input data object database 102, and, for each input data object, generates a respective score for each of a predetermined set of categories. For example, the initial data object classification system 106 can generate category scores 108 for the input data object 104. The score for a given category represents a likelihood that the input data object belongs to the category. Generally, the initial data object classification system 106 is a system that has been trained, e.g., on labeled training data objects, to generate the classification scores for input data objects.

For example, if the data objects are images, the initial data object classification system 106 can generate a respective score for each of a predetermined set of object categories. The score for a given object category represents the likelihood that the input image includes an image of an object that belongs to the object category. For example, if one of the object categories is horses, the score for the horses category represents a likelihood that the input image contains an image of a horse. The object categories may be generic, e.g., horses, or specific, e.g., George Washington. As another example, the object categories may include a generic numbers category or specific categories for each of the digits zero through nine. Each of the object categories is associated with a respective label, e.g., "horses" for a horses category or "nine" for a category that includes images of the digit nine.

An example initial image classification system that is a deep convolutional neural network is described in *Imagenet classification with deep convolutional neural networks*, Alex Krizhevsky, Ilya Sutskever, and Geoffrey E. Hinton, NIPS, pages 1106-1114, 2012.

The label generation engine 110 receives the classification scores generated by the initial data object classification system 106, e.g., the classification scores 108 for the data object 104, and generates the label data for the data object, e.g., the label data 114 for the data object 104, from the classification scores using data stored in a term representations data store 112.

The term representations data store 112 stores data that associates each term, i.e., each word or phrase, in a predetermined vocabulary of terms with a respective numeric representation for the term in a high-dimensional space, i.e., data that gives each term a location in the high-dimensional space. For example, the numeric representations may be one-thousand dimensional vectors of floating point values. Determining a label from a high-dimensional representation using the associations is described below with reference to FIGS. 2 and 3.

Figure 2:
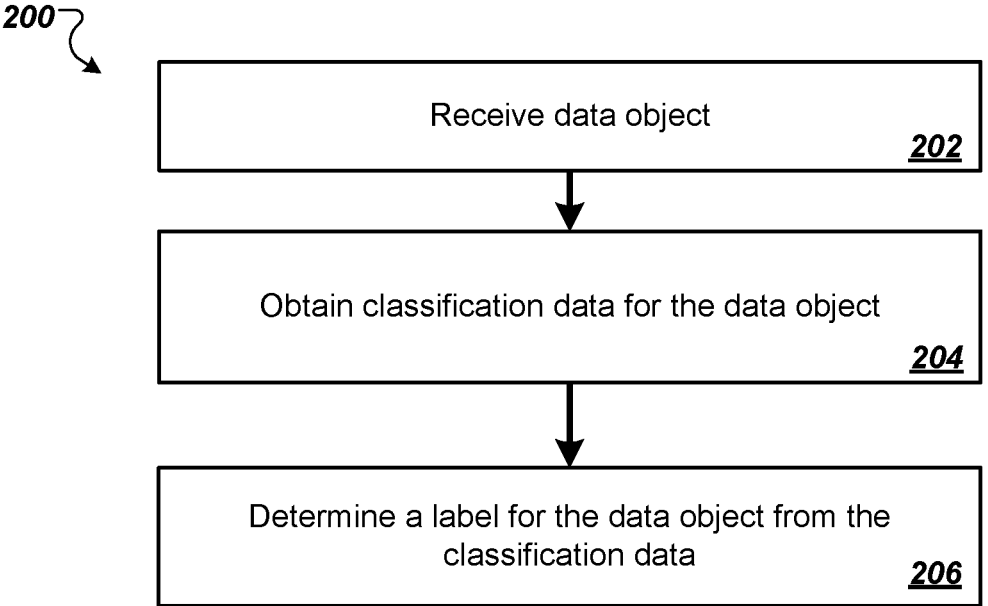
FIG. 2 is a flow diagram of an example process for generating one or more labels for an input data object.

FIG. 2 is a flow diagram of an example process 200 for generating one or more labels for an input data object. For convenience, the process 200 will be described as being performed by a system of one or more computers located in one or more locations. For example, a data object classification system, e.g., the data object classification system 100 of FIG. 1, appropriately programmed, can perform the process 200.

The system receives an input data object (step 202)

The system obtains classification data for the input data object (step 204). The classification data for the data object includes a respective initial score for each of a predetermined set of categories. The initial score for a given category represents the likelihood that the data object belongs to the category. Each of the categories is associated with a respective category label for the category.

For example, the classification data can be generated by an initial data object classification system e.g., the initial data object classification system 106 of FIG. 1, that processes the data object in order to generate classification scores for the data object.

In some implementations, the system selects a subset of initial scores, e.g., a predetermined number of highest scores or each score that exceeds a predetermined threshold value, applies a transformation to each selected initial score, and discards the remainder of the scores, i.e., refrains from using the remainder of the initial score in generating a label for the input data object. For example, the system can normalize the selected initial scores prior to using the scores to generate the labels.

The system determines one or more labels for the data object from the classification data (step 206). In order to determine the labels, the system accesses data stored in a term representations data store, e.g., the term representations data store 112 of FIG. 1. The term representations data store stores data that associates each term of a pre-determined vocabulary of terms with a high-dimensional representation for the term, i.e., gives each term a location in the high-dimensional space. The associations are generated so that the relative locations of terms reflect semantic and syntactic similarities between the terms. That is, the relative locations of terms in the high-dimensional space reflect syntactic similarities between the terms, e.g., showing that, by virtue of their relative location in the space, words that are similar to the word "he" may include the words "they," "me," "you," and so on, and semantic similarities, e.g., showing that, by virtue of their relative locations in the space the word "queen" is similar to the words "king" and "prince." Furthermore, relative locations in the space may show that the word "king" is similar to the word "queen" in the same sense as the word "prince" is similar to the word "princess," and, in addition, that the word "king" is similar to the word "prince" as the word "queen" is similar to the word "princess."

Additionally, operations can be performed on the locations to identify terms that have a desired relationship to other terms. In particular, vector subtraction and vector addition operations performed on the locations can be used to determine relationships between terms. For example, in order to identify a term X that has a similar relationship to a term A as a term B has to a term C, the following operation may be performed on the vectors representing terms A, B, and C: vector(B)−vector(C)+vector(A). For example, the operation vector("Man")−vector("Woman")+vector ("Queen") may result in a vector that is close to the vector representation of the word "King."

Associations of terms to high-dimensional vector representations having these characteristics can be generated by training a machine learning system configured to process each term in the vocabulary of terms to obtain a respective numeric representation of each term in the vocabulary in the high-dimensional space and to associate each term in the vocabulary with the respective numeric representation of the term in the high-dimensional space. Example techniques for training such a system and generating the associations are described in Tomas Mikolov, Kai Chen, Greg S. Corrado, and Jeffrey Dean, *Efficient estimation of word representations in vector space*, International Conference on Learning Representations (ICLR), Scottsdale, Arizona, USA, 2013.

Figure 3:
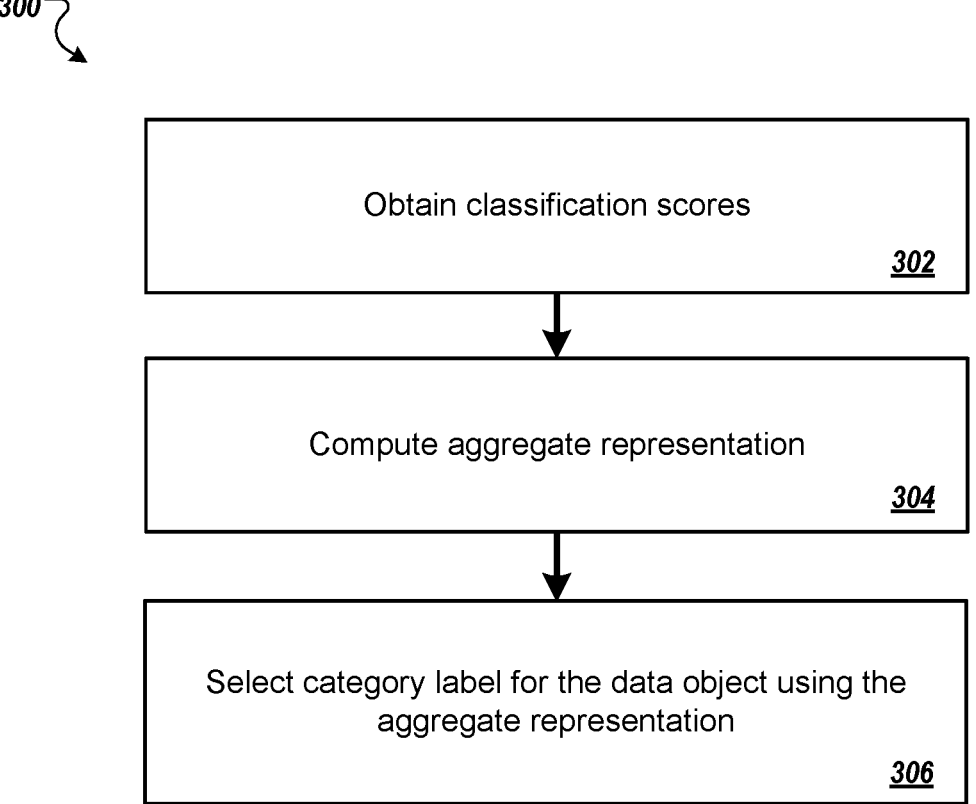
FIG. 3 is a flow diagram of an example process for generating one or more labels for an input data object from classification data for the input data object Like reference numbers and designations in the various drawings indicate like elements.

FIG. 3 is a flow diagram of an example process 300 for generating one or more labels for an input data object from classification data for the input data object. For convenience, the process 300 will be described as being performed by a system of one or more computers located in one or more locations. For example, a data object classification system, e.g., the data object classification system 100 of FIG. 1, appropriately programmed, can perform the process 300.

The system obtains classification data for an input data object (step 302).

The system computes an aggregate high-dimensional representation for the input data object from the classification data (step 304). In particular, in order to compute the aggregate representation for the input data, the system computes, for each of the categories that is associated with a score, a respective product between the high-dimensional representation of the category label for the category and the score for the category label. The system then combines the products to generate the aggregate representation for the input data object, e.g., by summing the respective products to generate the aggregate representation.

The system selects one or more category labels for the input data object using the aggregate high-dimensional representation for the input data object using the aggregate high-dimensional representation (step 306).

In some cases, each term that has an associated representation in the term representations data store may be a potential label for an input data object. In these cases, the system can determine the label for the input data object by determining the representation in the data store that is closest to the aggregate representation for the input data object. For example, the system can determine the closest representation by identifying the representation that has the largest cosine similarity value with the aggregate representation for the input data object or that is the closest representation to the aggregate representation using a different distance metric, e.g., Euclidian distance, Hamming distance, and so on. Similarly, the system can also regularize the representations and then compute the distance between the regularized representations.

The system can then select the term that is associated with the closest representation as the label for the input data object. Optionally, the system can select multiple terms as labels for the input data object and order the terms by relevance. That is, the system can determine that the term having the representation that is closest to the aggregate representation for the input image is the most relevant label for the input data object, the term that has the representation that is second closest to the aggregate representation for the input data object is the second most relevant label for the input image, and so on. In some cases, the system selects each term that has a representation that is closer than a threshold distance to the aggregate representation of the input data object as a label for the data object.

In some other cases, the term representations data store may also include representations for terms that are not potential labels for the input data object. In these cases, the system determines the closest representation that is associated with a potential data object and selects the potential label as the label for the input data object.

In yet other cases, the system may determine the closest representation that is associated with a term that has at least a specified level of generality and select the term as the label for the input data object. In some implementations, the system determines whether a particular term has at least the specified level of generality by determining whether the term is included in a pre-determined set of terms from the vocabulary of terms, i.e., a whitelist of terms provided by a user or system administrator. In other implementations, the system determines whether a particular term has at least the specified level of generality from the frequency with which the term appears in a text corpus. That is, the specified level of generality may be associated with a threshold frequency of occurrence, and the system can determine that any term that has a frequency of occurrence that exceeds the threshold frequency has at least the specified level of generality. The text corpus may include, for example, one or more of: Internet documents, search queries submitted to an Internet search engine, books, encyclopedia articles, and so on.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:

obtaining data comprising a respective high-dimensional representation for each category label of a plurality of category labels that each correspond to a different category of a plurality of categories, wherein the high-dimensional representation of the category label is a numeric representation of the category label in a high-dimensional space;

obtaining a new image to be classified;

processing the new image using a deep neural network to generate an aggregate high-dimensional representation of the new image from the high-dimensional representations of the plurality of category labels and respective scores for each category of one or more of the plurality of categories, wherein each of the respective scores represents a respective likelihood that the new image belongs to the corresponding category;

identifying a first term in a vocabulary of terms having a high-dimensional representation that is closest to the aggregate high-dimensional representation; and selecting the first term as a category label for the new image.

2. The method of claim 1, wherein processing the new image using the deep neural network to generate the aggregate high-dimensional representation of the new image comprises:

generating the respective scores for each category of the one or more of the plurality of categories by processing the new image using the deep neural network.

3. The method of claim 2, wherein processing the new image using the deep neural network comprises:

processing the new image using the deep neural network to obtain a plurality of initial scores;

selecting a pre-determined number of highest initial scores; and applying a transformation to each of the selected initial scores to generate the respective scores for the plurality of categories.

4. The method of claim 3, wherein applying the transformation to each of the selected initial scores comprises normalizing the selected initial scores.

5. The method of claim 1, further comprising:

identifying a second term in the vocabulary of terms having a high-dimensional representation that is second closest to the aggregate high-dimensional representation; and selecting the second term as another category label for the new image.

6. The method of claim 1, wherein identifying the first term comprises selecting a term having a high-dimensional representation that has a largest cosine similarity value with the aggregate high-dimensional representation.

7. The method of claim 1, wherein obtaining the data comprising a respective high-dimensional representation for each category label of a plurality of category labels that each correspond to a different category of a plurality of categories comprises:

training a machine learning system configured to process each category label of the plurality of category labels to obtain the respective high-dimensional representation of the category label and to associate each category label with the respective high-dimensional representation of the category label.

8. A system comprising one or more computers and one or more storage devices storing instructions that when executed by the one or more computers cause the one or more computers to perform operations comprising:

obtaining data comprising a respective high-dimensional representation for each category label of a plurality of category labels that each correspond to a different category of a plurality of categories, wherein the high-dimensional representation of the category label is a numeric representation of the category label in a high-dimensional space;

obtaining a new image to be classified;

processing the new image using a deep neural network to generate an aggregate high-dimensional representation of the new image from the high-dimensional representations of the plurality of category labels and respective scores for each category of one or more of the plurality of categories, wherein each of the respective scores represents a respective likelihood that the new image belongs to the corresponding category;

identifying a first term in a vocabulary of terms having a high-dimensional representation that is closest to the aggregate high-dimensional representation; and selecting the first term as a category label for the new image.

9. The system of claim 8, wherein processing the new image using the deep neural network to generate the aggregate high-dimensional representation of the new image comprises:

generating the respective scores for each category of the one or more of the plurality of categories by processing the new image using the deep neural network.

10. The system of claim 9, wherein processing the new image using the deep neural network comprises:

processing the new image using the deep neural network to obtain a plurality of initial scores;

selecting a pre-determined number of highest initial scores; and applying a transformation to each of the selected initial scores to generate the respective scores for the plurality of categories.

11. The system of claim 10, wherein applying the transformation to each of the selected initial scores comprises normalizing the selected initial scores.

12. The system of claim 8, the operations further comprise:

identifying a second term in the vocabulary of terms having a high-dimensional representation that is second closest to the aggregate high-dimensional representation; and selecting the second term as another category label for the new image.

13. The system of claim 8, wherein identifying the first term comprises selecting a term having a high-dimensional representation that has a largest cosine similarity value with the aggregate high-dimensional representation.

14. The system of claim 8, wherein obtaining the data comprising a respective high-dimensional representation for each category label of a plurality of category labels that each correspond to a different category of a plurality of categories comprises:

training a machine learning system configured to process each category label of the plurality of category labels to obtain the respective high-dimensional representation of the category label and to associate each category label with the respective high-dimensional representation of the category label.

15. A non-transitory computer storage medium encoded with a computer program, the computer program comprising instructions that when executed by one or more computers cause the one or more computers to perform operations comprising:

obtaining data comprising a respective high-dimensional representation for each category label of a plurality of category labels that each correspond to a different category of a plurality of categories, wherein the high-dimensional representation of the category label is a numeric representation of the category label in a high-dimensional space;

obtaining a new image to be classified;

processing the new image using a deep neural network to generate an aggregate high-dimensional representation of the new image from the high-dimensional representations of the plurality of category labels and respective scores for each category of one or more of the plurality of categories, wherein each of the respective scores represents a respective likelihood that the new image belongs to the corresponding category;

identifying a first term in a vocabulary of terms having a high-dimensional representation that is closest to the aggregate high-dimensional representation; and selecting the first term as a category label for the new image.

16. The non-transitory computer storage medium of claim 15, wherein processing the new image using the deep neural network to generate the aggregate high-dimensional representation of the new image comprises:

generating the respective scores for each category of the one or more of the plurality of categories by processing the new image using the deep neural network.

17. The non-transitory computer storage medium of claim 16, wherein processing the new image using the deep neural network comprises:

processing the new image using the deep neural network to obtain a plurality of initial scores;

selecting a pre-determined number of highest initial scores; and applying a transformation to each of the selected initial scores to generate the respective scores for the plurality of categories.

18. The non-transitory computer storage medium of claim 17, wherein applying the transformation to each of the selected initial scores comprises normalizing the selected initial scores.

19. The non-transitory computer storage medium of claim 15, further comprising:

identifying a second term in the vocabulary of terms having a high-dimensional representation that is second closest to the aggregate high-dimensional representation; and selecting the second term as another category label for the new image.

20. The non-transitory computer storage medium of claim 15, wherein identifying the first term comprises selecting a term having a high-dimensional representation that has a largest cosine similarity value with the aggregate high-dimensional representation.

* * * * *